No. 635,094. Patented Oct. 17, 1899.
G. W. FENDER.
SEED PLANTER AND FERTILIZER DISTRIBUTER.
(Application filed May 13, 1899.)
(No Model.) 2 Sheets—Sheet 1.
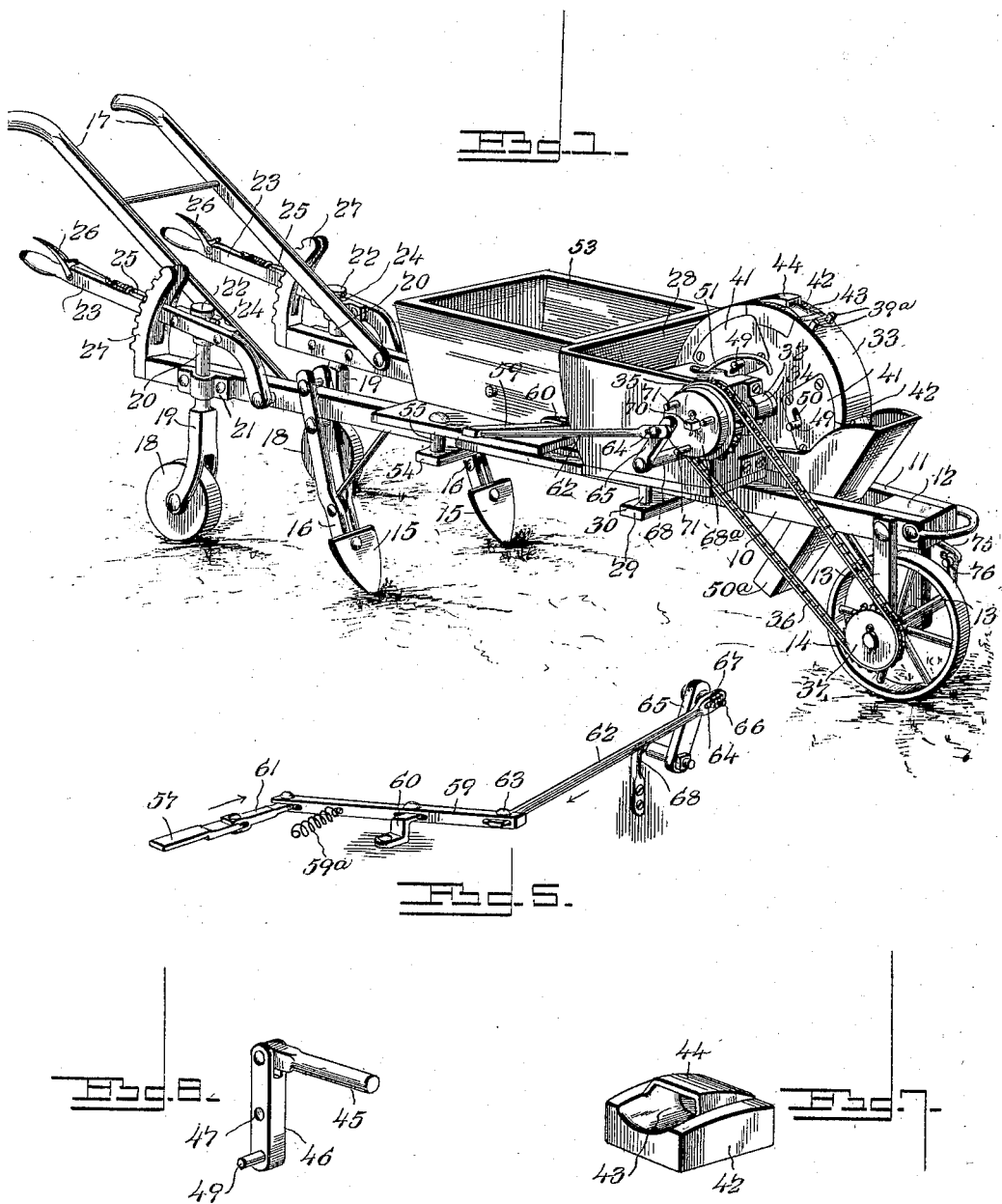
Witnesses  
E. K. Stewart  
H. F. Bemhof
G. W. Fender Inventor  
By Wills Attorneys,  
C. A. Snow & Co.

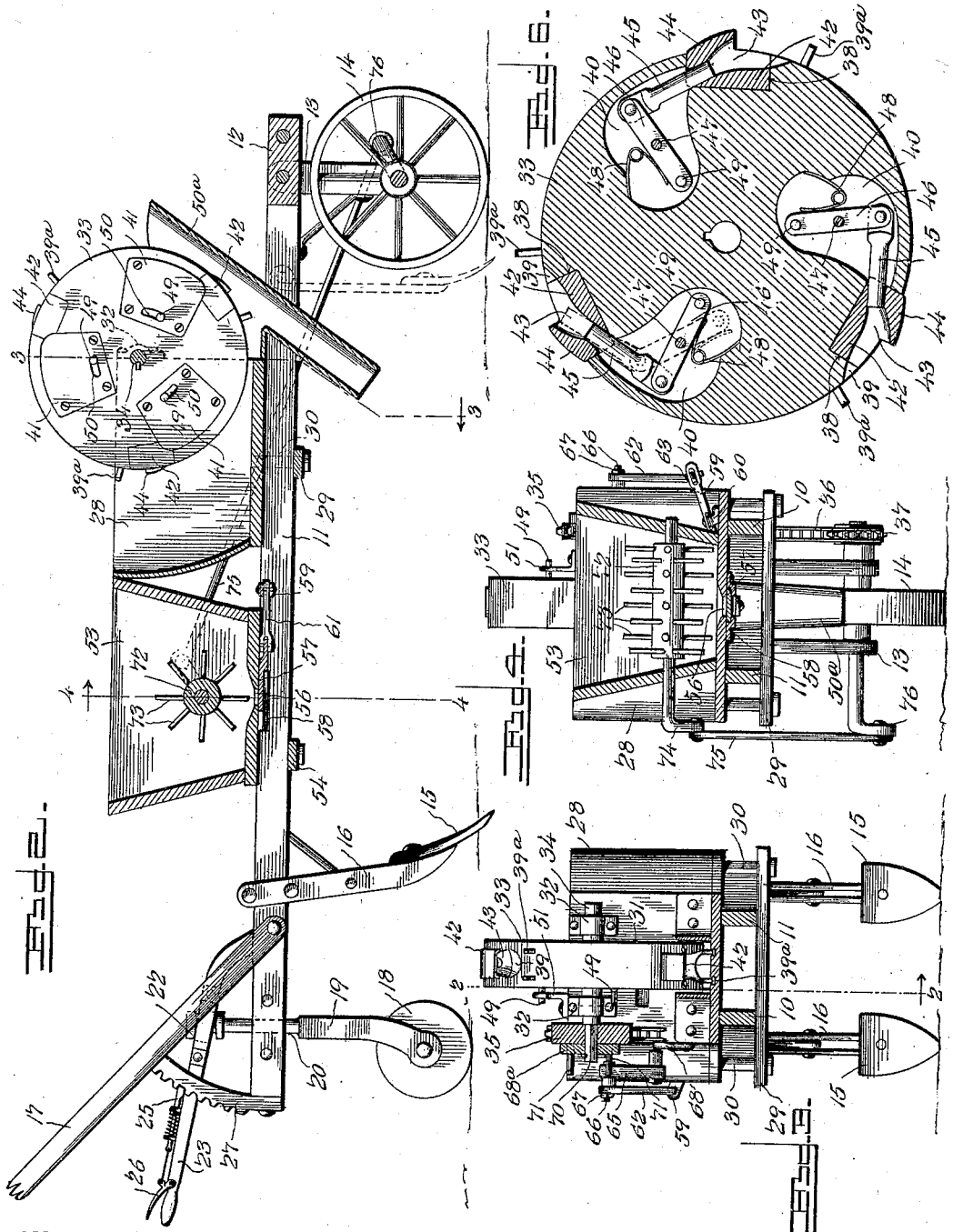

UNITED STATES PATENT OFFICE.

GEORGE W. FENDER, OF SPARKS, GEORGIA.

SEED-PLANTER AND FERTILIZER-DISTRIBUTER.

SPECIFICATION forming part of Letters Patent No. 635,094, dated October 17, 1899.

Application filed May 13, 1899. Serial No. 716,697. (No model.)

*To all whom it may concern:*

Be it known that I, GEORGE W. FENDER, a citizen of the United States, residing at Sparks, in the county of Berrien and State of Georgia, have invented a new and useful Seed-Planter and Fertilizer-Distributer, of which the following is a specification.

My invention relates to improvements in seed-planters and fertilizer-distributers; and the object in view is to provide means by which the grain or seed may be deposited at proper intervals in a furrow and the fertilizer also dropped at proper intervals and adjacent to the places of deposit of the seed, the seed and fertilizer dropping devices being actuated alternately to the end that the fertilizer may be dropped in the intervals between the discharge of the seed.

A further object of the invention is to provide means for regulating the operation of the seed-dropping mechanism and also of the fertilizer-distributing mechanism to discharge seed and fertilizer at variable intervals for the purpose of planting the seed at different distances apart.

A further object of the invention is the provision of a novel seed-dropping mechanism by which the seed is collected at regular intervals from the hopper and is positively expelled from the dropping device to prevent lodging of the seed and choking thereof in the seed-cups.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a perspective view of the seed-planter and fertilizer-distributer constructed in accordance with my invention. Fig. 2 is a longitudinal sectional elevation through the machine on the plane indicated by the dotted line 2 2 of Fig. 3. Fig. 3 is a vertical transverse section through the seed-dropping mechanism on the line 3 3 of Fig. 2. Fig. 4 is a vertical transverse section through the fertilizer-dropping mechanism on the plane indicated by the dotted line 4 4 of Fig. 2. Fig. 5 is a detail perspective view of the operating devices for the dropping-slide in the fertilizer-hopper. Fig. 6 is an enlarged sectional view of the seed-dropping disk removed from the planter. Fig. 7 is a detail perspective view of one of the seed-cups. Fig. 8 is a detail perspective view of the expelling devices for the seed-dropping mechanism, said expelling devices being detached from the disk.

Like numerals of reference denote like and corresponding parts in each of the several figures of the drawings.

The framework of my improved planter consists of the rearwardly-divergent beams 10 and 11, which are joined firmly together at their front ends by the spacing-block 12 and suitable through-bolts, and upon these beams are firmly clamped the hoppers, which are arranged in tandem fashion, or one in rear of the other, for the purpose of holding the seed in one hopper and the fertilizer in a separate or independent hopper. These hoppers are fastened to the beams firmly for the purpose of holding said beams in their spread positions; but, if desired, suitable braces or stays may be interposed between the beams in order to spread them and maintain the covering-shovels in spaced relation, so as to travel in pairs on opposite sides of the places where the seed and fertilizer are dropped.

A hanger 13 is secured in any approved way to the front end of the frame, and this hanger receives the axle of a ground-wheel 14, that serves to actuate the dropping devices for the seed and fertilizer hoppers. The covering-shovels 15 are fastened to the stock 16, attached to the rear ends of the beams, and the handles 17 are also fastened to the beams for guidance of the implement.

To assist the ground-wheel in supporting the machine and to prevent excessive weight and strain being imposed upon the covering-shovels, I provide the casters 18, which are disposed in rear of the shovels, so as to lie at the opposite end of the frame to the ground-wheel. These casters are mounted in the swiveled standards 19, and the standards are fashioned at their upper ends to produce the spindles 20. These spindles are fitted loosely in bearings 21, which are fastened firmly to the rear ends of the beams, and each spindle is provided at its upper extremity with a head 22. The spindle passes loosely through a slot 24 in an adjusting-lever 23, the front end of which is curved and fulcrumed upon a beam, substantially as shown by the drawings, and the head 22 of the spindle is designed to rest upon the adjusting-lever, while the spindle itself is fitted loosely in the slot of the lever. The lever carries a pawl 25, which is pivoted to a handpiece 26, the latter being mounted by a pivotal joint on the lever for the purpose of conveniently adjusting the pawl. A slotted and notched segment 27 is fastened to the rear extremity of the beam in a position for its bifurcated upper end to loosely embrace the adjusting-lever, and the notched segmental edge of this segment is presented to the nose of the pawl for the latter to engage with the segment, and thus enable the lever to hold the caster-wheels at the desired elevation. It will be obvious that the lever may be elevated or depressed to correspondingly adjust the caster-wheels, and as the spindles of the caster-standards are fitted loosely in the bearings and in the slotted levers the casters are free to turn in a horizontal plane, so that they may change their positions readily according to the draft on the implement.

The seed-hopper 28 is fitted to the main frame near the front end thereof and just in rear of the ground-wheel. In the practical embodiment of my invention this hopper is constructed in flared form and of sheet-metal side walls united to a suitable base. The hopper is arranged transversely across the main frame for its bottom to rest upon the beams, and said hopper is confined firmly in position by a clamping-bar 29 and the bolts 30. The clamping-bar is applied against the lower edges of the beams, and the bolts 30 are engaged with the hopper-bottom and with the ends of said clamping-bar. The front wall of the hopper is provided with a vertical slot 31, which extends from the bottom to the top edge, so as to divide the front wall to accommodate the revoluble seed-disk, and to this front wall are applied the journal-bearings 32, which are fastened firmly in place on opposite sides of the vertical slot. The seed wheel or disk 33 occupies a vertical position in the slot 31 of the hopper for rotation in a vertical plane around the horizontal axis, and this disk is firmly secured in any approved manner to a horizontal shaft 34, which is mounted in the bearings 32, one end of said shaft being extended or prolonged beyond the hopper, as indicated by Fig. 3. On this extended or prolonged end of the horizontal shaft is secured a driven sprocket-wheel 35, around which passes an endless sprocket-chain 36, which engages with a sprocket-pinion 37, which is secured to the extended end of the axle that carries the ground-wheel 14, whereby the sprocket-chain transmits the motion of the ground-wheel to the shaft 34, that carries the seed wheel or disk 33. The elements of the gearing between the seed-wheel shaft and the ground-wheel axle are proportioned to drive the seed wheel or disk at a speed proper for the discharge of the seed from its cups at the desired intervals apart; but the driving-sprocket 37 is secured removably to the axle of the ground-wheel, so that it may be replaced by a pinion of different diameter from the one displaced to the end that a different speed may be given to the seed wheel or disk, and thus provide for planting the seed at different distances apart.

The seed wheel or disk 33 is arranged to travel partly within the hopper 28, and this seed-wheel is peculiarly constructed to accommodate the seed-collecting cups and expelling devices, which are associated with said cups to secure the effective discharge of the seed therefrom, and thereby prevent lodgment of the seeds in the cup and choking of the latter. The disk or wheel 33 is provided at regular intervals in its periphery with the radial notches 38, and in the peripheral edge of this disk or wheel recesses 39 are formed to open into the radial notches. Within its periphery and adjacent to the radial notches therein the seed wheel or disk has a number of chambers or compartments 40, which correspond in number to the notches 38 and which communicate individually therewith. These chambers open through one face only of the seed-wheel, and the open side of the chambers are closed by the face-plates 41, which are preferably arranged flush with the face of the seed-disk, to which they are applied and which plates are secured firmly in place in any approved way. The seed-wheel carries a number of seed-cups 42, which are preferably made of metal and are cast in a single piece to conform substantially to the contour of the radial notches 38 in the peripheral edge of the disk. Each seed-cup is fitted in its notch in the disk to lie substantially flush with the faces and periphery of said disk, and each cup is formed with a pocket 43 and with a hood 44, the hood being integral with the cup preferably. The hood of the seed-cup extends slightly beyond the peripheral edge of the disk, and this hood does not entirely cover the pocket, thus leaving a portion of the pocket open or exposed for the lodgment or collection of the seed from the hopper as the seed-cup sweeps or travels through the hopper in the revolution of the seed-disk.

It will be understood that the seed-wheel may be equipped with any desired number of cups, although I have only shown three cups on the disk, and that the cups may be fastened to the disk by any preferred means. The hoods which partially close the pockets in the seed-cups serve to deflect the seed into the cups as they travel within the hopper on the rotation of the disk, and the seed within the hopper is agitated by the radial pins $39^a$, which are secured in pairs to the periphery of the disk adjacent to the recesses 39 and on opposite sides of the latter.

The seed-wheel carries a series of expelling devices which correspond in number to the seed-cups and are housed within the compartments 40 of the wheel or disk. Each expelling device has a reciprocating plunger 45, which is loosely fitted in the inner part of the pocket 43 in the seed-cup, and this plunger projects into the compartment 40. The heel of the plunger is pivoted to the upper end of a trigger 46, which is disposed in a substantially radial position within the compartments 40 of the disk or wheel, and this trigger is pivoted at a point intermediate of its length, as at 47. The pockets 43 have an approximately tangential arrangement, whereby they are best adapted to gather the seed by a positive action, the projecting ends of the hoods materially assisting in the gathering action. The plungers 45 have a corresponding tangential disposition, so as to expel the seed with the least expenditure of force, whereby the draft of the machine is not materially increased. The chambers 40 communicate with the pockets 43 and are ample to receive the plungers, the triggers, and the retracting-springs. The plunger is normally retracted to a position at the rear extremity of the pocket in the seed-cup by a spring 48, which has one end fitted against the trigger 46 and its other end bearing against the seed-wheel, whereby the plunger is normally held by the spring in a position to close the inner end of the cup-pocket. The trigger 46, at the end opposite to the pivot 47 of the plunger, is provided with an actuating-pin 49, which extends laterally from the trigger and projects through an arc-shaped slot 50, formed in the face-plate 41, and this pin 49 is adapted to engage with a yieldable detent 51, which is fixed on the hopper to lie in the path of the pin 49 on the series of triggers of all the expelling devices. This detent is shown in the drawings as consisting of a curved elastic arm, which is firmly fastened at one end to the hopper to assume a position close to one face of the disk or wheel, and in the revolution of the latter the operating-pins 49 engage successively with the detent for the purpose of moving the triggers in a direction against the tension of their retracting-springs, and thereby force the plungers 45 through the seed-cups, so as to expel from said cups the seed or corn which is contained in the pockets. The triggers are thus actuated automatically and successively on the rotation of the disk, and the seed-cups are prevented from choking by lodgment of the seed or grain therein.

A vertical seed tube or funnel 50ª is arranged between the ground-wheel and the hopper 28, and this tube or funnel is fitted between the pairs of beams so as to be secured firmly thereto. The upper end of the tube or funnel is enlarged and widened to form a broad flared mouth which partially embraces the exposed section of the revoluble seed disk or wheel, and the seed or grain from the cups 42 is discharged into the tube or funnel, that serves to conduct the seed to the ground and prevent scattering.

The fertilizer-hopper 53 may be constructed of metal or other suitable material, and it is provided with a bottom adapted to rest firmly upon the main frame. This fertilizer-hopper is held in place by a clamping-bar 54, fitted against the lower side of the frame and held in place by bolts 55, which are attached to the hopper-bottom. A vertical slot 56 is formed in the bottom of the fertilizer, and across this slot is arranged a slide-valve 57, which is fitted in suitable guides 58, that are attached to the hopper-bottom on the under side thereof. An operating-lever 59 is arranged in a position transversely to the length of the frame and between the seed and fertilizer hoppers, and this lever is fulcrumed at a point intermediate of its length to an arm 60, which is fixed either to the bottom of the fertilizer-hopper or the main frame. The inner end of this operating-lever is connected operatively with the slide-valve by the link 61, and to the outer end of the lever is connected a pitman 62 by a pivot-joint 63. The pitman extends alongside of the seed-hopper, and its front end is formed with a longitudinal slot 64, adapted to be connected to a rocker-arm 65 by a wrist-pin 66. The rocker-arm occupies an upright position contiguous to one end of the shaft 34, and said arm is fitted or mounted loosely on a short horizontal arm 68, the inner end of which is bent to form a vertical portion, as shown, and which is fixed to the seed-hopper. The wrist-pin 66 of the rocker-arm passes through the slot 64 in the pitman, and this wrist-pin and the pitman are prevented from becoming disconnected by a nut 67, which is screwed on a threaded extremity of the wrist-pin. The presence of the slot 64 in the pitman enables the latter to be connected by the wrist-pin to the rocker-arm at variable distances from the pivotal connection between the pitman and the operating-lever, and as the stroke or movement of the rocker-arm remains constant this adjustable connection of the pitman provides for variable movement of the operating-lever, so that the slide-valve may be reciprocated more or less to vary the quantity of the fertilizer which may be dropped through the slot in the bottom of the hopper. The slide-valve is held normally closed across the slot in the bottom of the hopper by a retracting-spring 59ª, which is attached to the lever 59 and the hopper, and this spring normally returns the lever to a position where the rocker-arm is moved by the pitman in the path of an actuating device on the seed-wheel shaft 34. This actuating device for the rocker-arm is a disk 68ª, having a series of pins 71, which are adapted to impinge or ride against the rocker-arm, and this disk is provided with a square aperture adapted to fit on the polygonal end 70 of the shaft 34. As the shaft is rotated it carries the disk 68ª with it, and the projecting pins 71 of said disk ride successively against the rocker-arm to move the latter in a rearward direction against the tension of the spring 59ª, and the pitman 62 is thereby moved to vibrate the lever 59 for the operation of the slide-valve 57. The actuating-disk 68ª may be changed in position on the polygonal end of the shaft 34 to vary the operation of the slide-valve through the described train of connections between said valve and the actuating-disk. It will be observed that the transmitting-gearing from the ground-wheel propels the seed wheel or disk and also actuates the mechanism by which the slide-valve in the fertilizer-hopper is opened. As the seed and fertilizer hoppers are arranged in tandem fashion the operating mechanism for the valve in the fertilizer-hopper should be actuated alternately with the dropping of the seed by the revoluble disk or wheel, and by thus operating the seed-dropping devices alternately with the fertilizer-dropping devices the fertilizer may be deposited adjacent to the places of deposit of the seed as the machine is drawn across the field.

To insure agitation of the fertilizer in the hopper 53, a rocking agitator or stirrer 72 is journaled in the side walls of the hopper, and this stirrer has a series of fingers 73, which are contiguous to the slot 56 in the hopper-bottom. One end of the agitator-shaft is provided with a crank-arm 74, to which is connected a pitman 75, that extends lengthwise of the machine for its forward end to be attached to a crank-arm 76 on the end of the ground-wheel axle opposite to the driving sprocket-pinion 37.

The casters 18 may be adjusted to serve in connection with the ground-wheel for the purpose of sustaining a part of the weight of the machine and obviate undue strain on the covering-shovels. I do not, however, limit myself to the employment of these caster-wheels, because they may be dispensed with by employing an opener-shovel which is carried by a stock attached to the front end of the machine, said opener-shovel being arranged between the ground-wheel and the seed tube or funnel, as indicated by dotted lines in Fig. 2. In lieu of the pair of oppositely-inclined shovels I may employ a transverse covering-board adapted to be fastened to one or both of the stocks in a manner to throw the dirt over the seed and fertilizer after they shall have been deposited in the furrow.

Changes may be made in the form and proportion of some of the parts while their essential features are retained and the spirt of the invention embodied. Hence I do not desire to be limited to the precise form of all the parts as shown, reserving the right to vary therefrom.

In lieu of the disk 68ª to actuate the valve mechanism of the fertilizer-hopper I may employ a many-sided plate adapted to ride against the rocker-arm—as, for example, the plate may be triangular, square, or of other polygonal form to carry pins which will impart variable play to the mechanism which actuates the valve across the slot in the bottom of the fertilizer-hopper.

What I claim is—

1. In a planter, a revoluble seed-wheel provided with a seed-gathering cup which is arranged in a tangential position to the periphery of the wheel, said cup having a hood, 44, which projects forwardly from the closed rear part of the cup and beyond the peripheral edge of the disk, whereby the hood gathers and directs the seed into the cup on the rotation of the disk, in combination with an expelling device, and means for actuating said device, substantially as described.

2. In a planter, a revoluble seed-wheel provided with a tangential seed-gathering cup having a hood, 44, which projects beyond the periphery of the wheel and in advance of the rear end of the cup, said rear end of the cup having a wall with a single opening, and a plunger fitted slidably in the opening at the rear of said cup and arranged tangentially to the disk, in combination with means for automatically reciprocating the plunger on the rotation of the disk, substantially as described.

3. In a planter, a revoluble seed wheel or disk provided with a compartment, a seed-cup arranged tangentially to the periphery of the disk and having a hood, 44, with an open front end lying beyond the periphery of said disk, a spring-controlled trigger pivoted to the seed-disk within the compartment thereof, an expelling-plunger fitted in the seed-cup and connected with the trigger, and a detent lying in the path of a projection on said trigger, substantially as described.

4. In a planter, a revoluble seed-disk provided with a plurality of radial notches and with compartments contiguous to said notches, combined with seed-cups secured in the notches of the disk and each having a hood which projects beyond the periphery of the disk and is arranged tangentially thereto, triggers housed within the compartments of the disk and having exposed actuating-fingers, plungers fitted in the seed-cups in tangential relation to the disk and connected with the triggers, and means to engage with the triggers for actuating the plungers, substantially as described.

5. In a planter, a revoluble seed wheel or disk provided with the compartments and with the slotted face-plates, combined with seed-cups secured to the disk or wheel and each having a hood which projects beyond the periphery of the disk and is arranged tangentially thereto, triggers pivoted to the disk to lie within the compartments thereof, and provided with fingers which project through the slots in the face-plate, springs acting against the triggers, plungers fitted to the seed-cups and pivoted to the triggers, and a detent in the path of the trigger-fingers, substantially as described.

6. In a planter, the combination with a seed-hopper, a fertilizer-hopper, and a ground-wheel, of a seed-dropping shaft mounted within the seed-hopper, a seed-dropping disk fast with said shaft, gear connections between the ground-wheel and the seed-dropping shaft, a valve mechanism in the bottom of the fertilizer-hopper, a lever mounted on the planter-frame and connected to said valve mechanism, a rocker-arm linked to the operating-lever, and a revoluble actuator device fast with the seed-dropping shaft and having means to ride against the actuator-arm, whereby the valve is reciprocated by the rocker-arm and the lever from the actuator device on said seed-dropping shaft, substantially as described.

7. In a planter, the combination with a seed-hopper, a fertilizer-hopper, and a revoluble seed-dropping shaft in the seed-hopper, of a valve mechanism in the bottom of the fertilizer-hopper, a lever connected to the valve mechanism, a revoluble actuator-disk fast with the dropping-shaft and having a series of studs, a rocker-arm lying in the path of the studs on said disk, a pitman pivoted to the lever, and adjustable connections between the pitman and the rocker-arm, substantially as described.

8. The combination with a frame having a ground-wheel, planting devices on said frame, and covering-shovels carried by the frame, of the swiveled hangers mounted loosely on the frame at the rear thereof and provided with headed spindles, adjusting-levers fulcrumed at their forward ends on the frame and receiving the headed spindles intermediate of their ends, slotted and notched segments applied to the frame and receiving the respective levers between their spaced parts, and pawls applied to the levers to engage with the spaced members of the respective segments, substantially as described.

In testimony that I claim the foregoing as my own I have hereto affixed my signature in the presence of two witnesses.

GEORGE W. FENDER.

Witnesses:
J. B. ROWEN,
J. H. GASKIN.